Jan. 23, 1968  R. R. BARRINGTON  3,365,183
FURNACES FOR THE HEAT TREATMENT OF PARTICULATE MATERIAL
Filed Feb. 24, 1965  2 Sheets-Sheet 1
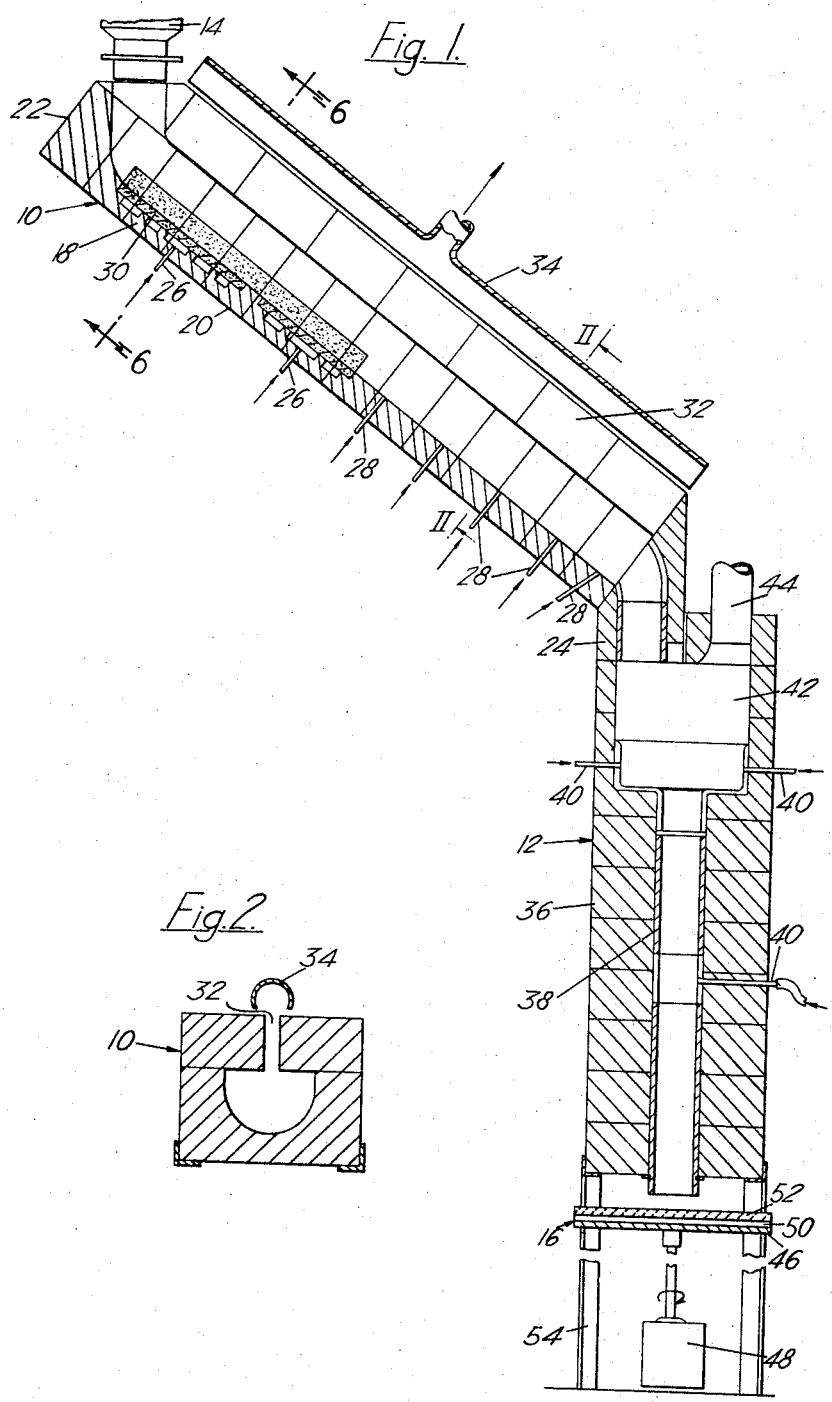
Inventor
Robert Ross Barrington
BY
Peter P. Kozak
Attorney Jan. 23, 1968  R. R. BARRINGTON  3,365,183
FURNACES FOR THE HEAT TREATMENT OF PARTICULATE MATERIAL
Filed Feb. 24, 1965  2 Sheets-Sheet 2
*Fig.3.*
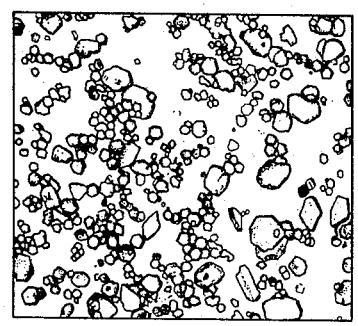
*Fig.5.*
*Fig.4.*
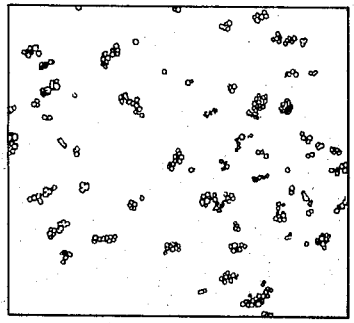
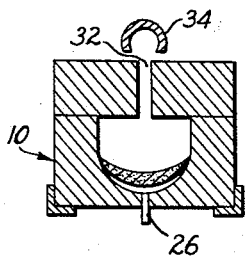
*Fig.6.*
Inventor
Robert Ross Barrington
BY
Peter P. Kozak
Attorney United States Patent Office 3,365,183
Patented Jan. 23, 1968

3,365,183
FURNACES FOR THE HEAT TREATMENT
OF PARTICULATE MATERIAL
Robert Ross Barrington, Luton, England, assignor to
General Motors Corporation, Detroit, Mich., a corporation of Delaware
Filed Feb. 24, 1965, Ser. No. 434,909
Claims priority, application Great Britain,
Mar. 4, 1964, 9,053/64
12 Claims. (Cl. 266—27)

ABSTRACT OF THE DISCLOSURE

This disclosure relates to a furnace for the heat treatment of particulate material. The furnace consists of an inclined refractory tube down which the particulate material can pass. Along the bottom of the refractory tube are a series of burner devices which project combustible gas into the mass of the particulate material passing through the refractory tube so that combustion occurs within the mass of the particulate material. Along the top of the refractory tube is a longitudinal vent which provides for the escape of the gaseous combustion products formed in the refractory tube.

This invention relates to furnaces for the heat treatment for particulate material.

The present invention is concerned with a furnace which allows the heat treatment of particulate material to be effected under conditions allowing escape of the gaseous products of the heat treatment from the vicinity of the solid material immediately after their production.

The furnace according to the present invention for the heat treatment of particulate material comprises an inclined refractory tube down which the material can pass, a series of burner devices extending along the bottom of the tube, and a vent along the top of the tube for the escape of the gaseous products of the heat treatment.

There is conveniently a feed device at the upper end of the tube for the supply of the particulate material to the tube. The feed device may for example be a feed hopper.

The preferred angle of inclination of the tube is approximately 45°.

The internal cross-section of the tube may be generally semi-circular at its most lowermost portion and narrow to the vent. The burner devices are preferably constructed to project a combustible gas at a velocity greater than that of flame propagation, whereby combustion occurs within the mass of the particulate material. It is desirable for the burner devices at the inlet portion of the tube to include a layer of porous refractory material, for providing a diffuse flow of combustion gas into the tube.

The furnace preferably includes a heat-soak device arranged and adapted to receive the material discharged from the tube and to control its rate of cooling: this device may consist of a vertical tube provided with burner devices for maintaining the material received from the inclined tube at a controlled but decreasing temperature as it passes down the vertical tube. The upper end of the vertical tube constituting the heat-soak device is preferably enlarged to form an entrance chamber which has an escape vent at its upper end for the escape of gaseous products from the material passing down the heat-soak device.

A rotary scraper or conveyor can be disposed at the discharge end of the heat-soak device to form a take-off device for the removal of the heat-treated material. In conjunction with the use of a hopper or similar feed device at the upper end of the inclined tube, the take-off device can be set to allow the furnace to operate continuously and at a controlled rate, the particulate material sliding or rolling down the tube as it undergoes the heat treatment.

The scope of the monopoly is defined by the appended claims; the invention and how it can be performed are hereinafter particularly described with reference to the accompanying drawings, in which:

FIGURE 1 is a vertical section through a preferred embodiment of a heat-treatment furnace according to the present invention;

FIGURE 2 is a cross-section on the line II—II of FIGURE 1, in the direction of the arrows;

FIGURE 3 is a photomicrograph at 1000× magnification, showing a finely crystalline calcined alumina;

FIGURE 4 is a comparative photomicrograph which is similar to FIGURE 3 but shows a coarsely crystalline calcined alumina;

FIGURE 5 shows scale divisions applicable to both FIGURES 3 and 4, the spacing of the smallest scale divisions shown being 1.8 microns; and FIGURE 6 is a cross-section on the line 6—6 of FIGURE 1, in the direction of the arrows.

The furnace shown in FIGURE 1 of the drawings comprises an inclined refractory tube indicated generally by the reference numeral 10, a heat-soak device arranged at the lower end of the tube 10 and indicated generally by the reference numeral 12, a feed device in the form of a feed hopper 14 at the upper end of the tube 10 for the supply of particulate material to the tube, and a take-off device in the form of a rotary scraper indicated generally by the reference numeral 16 for the removal of heat-treated material from the discharge end of the heat-soak device.

The inclined tube 10 is at an angle of inclination of approximately 45° and is made of refractory blocks 18 with a liner of recrystallized alumina refractory material. The tube comprises a straight portion 20 and end pieces 22 and 24 constituting connections to the feed hopper 14 and the heat-soak device 12 respectively.

A series of burner devices 26 and 28 extends along the bottom of the tube 10. The burner devices 26, which are situated at the inlet portion of the tube 10, each comprise a feed pipe which opens into an annular space in the tube 10 separated from the interior of the tube by a layer of porous refractory material 30 for providing a diffuse flow of combustion gas into the tube. The burner devices 28, which are situated at the outlet portion of the tube 10, comprise tubes of recrystallized alumina refractory material constituting burner jets.

A vent 32 along the top of the tube 10 allows escape of the gaseous products of the heat treatment from the vicinity of the solid particulate material in the tube immediately after their production. The vent is an elongated discharge vent constituted by a slot extending along the top of the tube 10 for the whole length of the tube. An exhaust hood 34 above the vent 32 is used to remove the gaseous products escaping from the vent.

The heat-soak device 12 is made of refractory blocks 36 with a liner 38 made of recrystallized alumina refractory material. A vertical tube forming part of the heat-soak device is provided with burner devices 40 for maintaining the material received from the inclined tube at a controlled but decreasing temperature as it passes down the vertical tube. The upper end of the vertical tube is enlarged to form an entrance chamber 42, which has an escape vent 44 at its upper end. An upper series of the burner devices 40 extends radially into the lower part of the entrance chamber 42, and a lower series of the burner devices extends into the heat-soak device about half-way down the vertical tube. The burner devices 40 are similar in construction to the burner devices 28 and likewise are made of recrystallized alumina refractory material.

The take-off device 16 comprises a horizontal disc 46 rotatable by a drive motor 48. A cross key 50 is welded to the upper surface of the disc 46 and covered by a layer of refractory material 52. The lower end of the heat-soak device is supported by struts 54.

As shown in FIGURE 2, the internal cross-section of the tube 10 is generally semi-circular at its lowermost portion, and narrows to the vent 32.

In operation of the furnace, the tubular interior of the furnace is filled with particulate material, combustion gas being supplied to the burners 26 and 28 of the inclined tube at a velocity greater than that of flame propagation so that combustion occurs within the mass of the particulate material. Combustion gas is also supplied to the burner devices 40 of the heat-soak device 12. With a constant supply of particulate material from the feed hopper 14 available at the upper end of the inclined tube 10, the speed at which the material passes through the furnace can be controlled by setting the speed of the drive motor 48 to a value which gives a suitable discharge rate of heat-treated material from the lower end of the heat-soak device, whereby the particulate material, which is preferably in the form of balls, slides or rolls down the tube 10 as it undergoes the heat treatment, fresh material being continuously supplied as required from the feed hopper 14. The burner jets 26 and 28 in the inclined tube 10 maintain a powerful cross-flow of combustion gases which remove the gaseous products of the heat treatment in an efficient manner by sweeping them away from the vicinity of the solid material immediately after their production, the gaseous products escaping in a relatively unrestricted manner through the vent 32 which extends along the whole length of the top of the inclined tube. The gases are then drawn off through the exhaust hood 34. The burner devices 40 in the heat-soak device 12 are set to maintain the material from the inclined tube at controlled but gradually decreasing temperature as it passes down the vertical tube of the heat-soak device, the gaseous products evolved during residence of the material in the heat-soak device escaping through the escape vent 44.

By the use of the described furnace for the heat treatment of particulate material by means of a combustible gas, efficient contact can be obtained between the combustion gas and the particulate material.

One useful application of the furnace which has just been described is in the production of alumina by calcination of an aluminium hydroxide. For this purpose the feed hopper 14 is charged with coherent ball-shaped masses of aluminium hydroxide, preferably having a water content of around 8% by weight, and the burner devices of the furnace are supplied with combustion gas at such a rate that the ball-shaped masses are heated to a maximum temperature of 1400° C. in the inclined tube, and have a temperature gradient of approximately 1400° to 1300° C. from the inlet end of the heat-soak device to its discharge end. Because the furnace allows the gaseous products of the calcination to escape from the vicinity of the solid material immediately after their production, the gaseous products of the calcination are removed from the vicinity of the solid material before the temperature of the solid material exceeds 1000° C., and do not subsequently come into contact with the solid material and contaminate it. The calcined alumina produced is in the form of very fine crystals which have a mean crystal size of 2 microns, as shown in FIGURE 3, and yet are not bulky but are highly compactible. This calcined alumina is highly suitable for the production of sintered high-alumina refractory bodies, for example spark plug insulators, by firing a refractory mixture containing not less than 90% by weight of the calcined alumina, since it allows the use of a relatively low firing temperature and gives relatively low shrinkage during firing. The calcined alumina also has a very low soda content, consistently less than 0.02% by weight residual $Na_2O$, this low soda content being attributable to the rapid escape from the longitudinal slot-like vent of the volatilized sodium borate forming one of the gaseous products of the calcination.

By way of contrast, FIGURE 4 shows coarse crystals of alumina which result from calcining coherent ball-shaped masses of aluminium hydroxide initially at 1100° C. (with subsequent heating to about 1500° C. to complete the calcination): these crystals vary considerably in size from 2 microns to as much as 8 or 9 microns.

The coherent ball-shaped masses of aluminium hydroxide may be produced by heating aluminium trihydroxide, preferably produced by the Bayer process, to reduce its water content to between 5% and 8% by weight, the preferred water content being 8% by weight, and grinding the resulting material. The ground material is then preferably treated with a solution of boric acid, and the treated material is formed into coherent ball-shaped masses, for example by tumbling in a conventional rotary tabletting pan. To reduce the water content, a temperature of about 300° C. is suitable.

The amount of boric acid solution is preferably such with a quantity of boric acid between 1% and 5% of the weight of the aluminium hydroxide is incorporated in the ground material. A small proportion of fluoride ion may additionally be admixed with the ground material, for example by the addition of hydrofluoric acid, to speed up the conversion occurring during the calcination.

The following examples and respective control experiments further illustrate the calcination of alumina with the aid of the furnace shown in the drawings:

EXAMPLE 1

Aluminium trihydroxide produced by the Bayer process was heated to a temperature of 300° C. until its water content has fallen to about 8% by weight, and was then ground, admixed with 2% by weight of boric acid and 0.5% by weight of hydrofluoric acid, and formed into coherent ball-shaped masses by tumbling in a rotary tabletting pan. The ball-shaped masses were then calcined at a temperature of around 1,400° C. for a period of 30 mins. in a calcination furnace as shown in the accompanying drawings. The product of the calcination was an alpha alumina in the form of a very small crystals with a mean crystal size of 2 microns and a compactability of about 0.340 in.

The compactability figure is a value related to the ultimate compactability of the alumina, and is the length in inches of a 10 gram sample of the alumina in a cylinder having an interior diameter of 1 cm. after the sample has been subjected to 100 impacts of a force determined by a standard spring. The cylinder used has an effective weight of 1.75 lbs. when containing the sample, and the spring exerts a maximum force of 4.5 lbs. on the cylinder.

The calcined alumina (alpha alumina) as described in this example was found to be highly suitable for the production of spark plug insulators, since the alumina was of high purity, having a soda content below 0.01% $Na_2O$, and had a high rate of maturing to produce sintered insulating bodies, the bodies produced having a relatively high density.

Control experiment 1

A commercial aluminium trihydroxide produced by the Bayer process was admixed with 2% by weight of boric acid and 0.5% by weight hydrofluoric acid, and the resulting material was placed in an open-topped sagger and calcined in a periodic kiln. The calcination was effected at a temperature of 1,400° C. for a period of 30 mins., and the product was found to consist of large plate-like crystals of alpha alumina which had a particle size up to 20 microns and were not very suitable for firing to form spark plug insulators because they were slow to mature to maximum and had a high soda content, approximately 0.05 to 0.1% by weight $Na_2O$.

EXAMPLE 2

Coherent ball-shaped masses produced as described in Example 1 were heated to a temperature of 1,000° C. for 15 mins. under conditions allowing escape of the gaseous products from the vicinity of the solid material immediately after their production, after which time the temperature was raised to 1,500° C. and held at this value for a further 10 mins. to complete the calcination. The outer layers of the calcined material were found to have a very fine crystal structure, and to break down to form almost symmetrical particles with a mean crystal size of substantially 2 microns. FIGURE 3 of the drawings is a photomicrograph at 1,000× magnification of these particles.

Control experiment 2

The procedure described in Example 2 was repeated except that the initial heating was effected at a temperature of 1,100° C. for 15 mins., again with subsequent heating to 1,500° C. for 10 mins. The outside layers of the calcined product had a large crystal structure, with a particle size from 2 microns up to 8 or 9 microns, as shown in FIGURE 4 of the drawings, which again is a photomicrograph at a magnification of 1000×.

EXAMPLE 3

A high-alumina refractory mix suitable for the manufacture of spark plug insulators was made up from 90% by weight calcined alumina produced as described in Example 1, together with 10% by weight of conventional fluxing ingredients. The mix was processed in known manner to produce moulded spark plug insulator blanks, which were eventually fired in a kiln to produce spark plug insulators.

However, to follow the course of the vitrification, a batch of ten insulator blanks was subjected to simulated firing conditions in a furnace, as follows:

The ten insulator blanks were placed on a flat refractory sagger in the middle of the furnace, the temperature of which was raised at a uniform gradient over 3 hours to 1,550° C. The temperature was then held constant for 2 hours, whereupon it was raised to 1,600° C. and again held for a further 2 hours. During this programme one of the insulator blanks was taken from the furnace at each of the following temperatures and times:

|     |                     | ° C.  |
|-----|---------------------|-------|
| (1) | On reaching         | 1,525 |
| (2) | On reaching         | 1,550 |
| (3) | After ½ hour at     | 1,550 |
| (4) | After 1 hour at     | 1,550 |
| (5) | After 1½ hours at   | 1,550 |
| (6) | After 2 hours at    | 1,550 |
| (7) | On reaching         | 1,600 |
| (8) | After ½ hour at     | 1,600 |
| (9) | After 1 hour at     | 1,600 |
| (10)| After 2 hours at    | 1,600 |

The specific gravities of these insulator blanks were plotted against the temperature and time.

Control experiment 3

The procedure described in Example 3 was repeated except that the calcined alumina used in the refractory mix was made as described in control experiment 1. The specific gravities were plotted on the same graph as was used in Example 3. From the resulting combined graph it was established that as the density of the insulators increased to a maximum, those made from the alumina made according to this invention (Example 1) were consistently higher than those made from the plate-like coarsely crystallin alumina, (control experiment 1) and that to attain the same final density, insulators made from the latter had to be heated an additional 50° C.

To achieve the specific gravities indicated below, the firing times and temperatures of the respective mixes were as follows:

| Specific gravity | Mix made from 2-micron Alumina of Example 1 | Mix made from Plate-like Alumina of control experiment 1 |
|---|---|---|
| 3.43 | On reaching 1,525° C | After 1 hour at 1,550° C. |
| 3.65 (max.) | After ½ hr. at 1,550° C | After ½ hour at 1,600° C. |

I claim:
1. A furnace for the heat treatment of particulate material, comprising an inclined refractory tube down which the material can pass, a series of burner devices extending along the bottom of the tube, and an elongated discharge vent comprising a slot extending along the top of the tube for substantially the length thereof for the escape of the gaseous products of the heat treatment.

2. A furnace for the heat treatment of particulate material, comprising an inclined refractory tube, a feed device at the upper end of the tube for the supply of particulate material to the tube, a series of burner devices extending along the bottom of the tube, and an elongated discharge vent comprising a slot extending along the top of the tube for substantially the length thereof for the escape of the gaseous products of the heat treatment.

3. A furnace for the heat treatment of particulate material, comprising an inclined refractory tube, a feed device at the upper end of the tube for the supply of particulate material to the tube, a series of burner devices extending along the bottom of the tube, an elongated discharge vent comprising a slot extending along the top of the tube for substantially the length thereof for the escape of the gaseous products of the heat treatment, and a heat-soak device arranged and adapted to receive the material discharged from the tube and to control its rate of cooling.

4. A furnace for the heat treatment of particulate material, comprising an inclined refractory tube, a feed device at the upper end of the tube for the supply of particulate material to the tube, a series of burner devices extending along the bottom of the tube, an elongated discharge vent comprising a slot extending along the top of the tube for substantially the length thereof for the escape of the gaseous products of the heat treatment, a heat-soak device constituted by a vertical tube connected at the lower end of the inclined tube to receive the material discharged from the tube, and burner devices associated with the vertical tube for maintaining material passing down the tube at a controlled but decreasing temperature.

5. A furnace according to claim 4, wherein the upper end of the vertical tube constituting the heat-soak device is enlarged to form an entrance chamber, and an escape vent is provided at the upper end of the entrance chamber.

6. A furnace according to claim 4, wherein the angle of inclination of the tube is approximately 45°.

7. A furnace according to claim 4, wherein the internal cross-section of the inclined tube is generally semi-circular at its lowermost portion and narrows to the vent.

8. A furnace for the heat treatment of particulate material, comprising an inclined refractory tube the internal cross-section of which is generally semi-circular at its lowermost portion and narrows upwardly, a feed device at the upper end of the tube for the supply of particulate material to the tube, a series of burner devices extending along the bottom of the tube and adapted to project a combustible gas at a velocity greater than that of flame propogation, a vent along the top of the tube for the escape of the gaseous products of the heat treatment, a heat-soak device arranged and adapted to receive the material discharged from the tube and to control its rate of cooling, and a take-off device for the removal of heat-treated material from the discharge end of the heat-soak device.

9. A furnace according to claim 8, wherein the burner devices at the inlet portion of the tube include a layer of porous refractory material for providing a diffuse flow of combustion gas into the tube.

10. A furnace for the heat treatment of particulate material, comprising an inclined refractory tube the internal cross-section of which is generally semi-circular at its lowermost portion and narrows upwardly, a feed device at the upper end of the tube for the supply of particulate material to the tube, a series of burner devices extending along the bottom of the tube and adapted to project a combustible gas at a velocity greater than that of flame propagation, a vent along the top of the tube for the escape of the gaseous products of the heat treatment, a heat-soak device arranged and adapted to receive the material discharged from the tube and to control its rate of cooling, and a take-off device constituted by a rotary scraper for the removal of heat-treated material from the discharge end of the heat-soak device.

11. A furnace according to claim 10, made of refractory blocks with a liner of recrystallized alumina refractory material.

12. A furnace according to claim 10, wherein the heat-soak device consists of a vertical tube which is provided with burners for maintaining the material received from the inclined tube at a controlled but decreasing temperature as it passes down the vertical tube, and the upper end of which is enlarged to form an entrance chamber which has an escape vent at its upper end.

References Cited
UNITED STATES PATENTS

| | | | |
|---|---|---|---|
| 2,339,192 | 1/1944 | Roberson | 266—25 |
| 3,084,922 | 4/1963 | Pagnant | 263—29 |
| 3,093,570 | 6/1963 | Dewey | 266—43 X |
| 3,163,520 | 12/1964 | Collin et al. | 266—27 X |
| 3,203,785 | 8/1965 | Knuppel | 266—43 X |
| 3,234,010 | 2/1966 | Mahoney | 266—25 X |

J. SPENCER OVERHOLSER, *Primary Examiner.*

E. MAR, *Assistant Examiner.*